United States Patent [19]

Rader et al.

[11] 3,781,115

[45] Dec. 25, 1973

[54] METHOD AND APPARATUS FOR NON-CONTACT SURFACE MEASUREMENT

[75] Inventors: Edwin R. Rader; Clarence A. Ripley, Jr., both of Tallmadge, Ohio

[73] Assignee: Monitor Systems Corporation, Akron, Ohio

[22] Filed: Feb. 14, 1972

[21] Appl. No.: 225,973

[52] U.S. Cl............. 356/167, 356/158, 356/160, 356/172, 250/217 SS, 250/219 WD, 250/220 M
[51] Int. Cl.. G01b 11/00, G01b 11/04, G01b 11/30
[58] Field of Search................. 356/102, 157, 159, 356/160, 167, 199, 222, 158, 172; 250/205, 217 SS, 219 WD, 220 R, 220 M

[56] References Cited
UNITED STATES PATENTS

| | | | |
|---|---|---|---|
| 3,619,626 | 11/1971 | Rudolph | 356/160 |
| 3,513,444 | 5/1970 | Henderson et al. | 356/157 |
| 2,968,210 | 1/1961 | Perrozzi et al. | 356/157 |

Primary Examiner—David Schonberg
Assistant Examiner—Paul K. Godwin
Attorney—Vern L. Oldham et al.

[57] ABSTRACT

The invention relates to a method and apparatus to measure surfaces without contacting the surfaces. It incorporates a plurality of light beams, means to sequentially actuate the beams and means to detect the beams as they are actuated. The surface of an object extending into the beams will interrupt one or more of the beams. The beam being partially interrupted is determined. Then the proportion of the partially interrupted beam is determined. The beams have a uniform light distribution across their width so the proportional measurement accurately determines the distance of surface intrusion. Since the position of the beam is known, a highly precise measurement of the position of the surface is achieved. If no beams are interrupted, new beam paths are established to provide a broad range of coverage. Electronic controls insure a fast response and accuracy to at least 0.0001 inches.

18 Claims, 19 Drawing Figures

METHOD AND APPARATUS FOR NON-CONTACT SURFACE MEASUREMENT

HISTORY OF THE INVENTION

The invention basically relates to an efficient and inexpensive means for dimensional measurement of objects as they are being formed on the production floor or by a machine. Specifically, it is a way other than mechanical testing to determine the peripheral surfaces of objects as they take size and shape. Applications of the apparatus include at least the following areas:

a. Production testing of tires and rims;
b. Electronic micrometer - i.e., a continuous dimensional monitor of parts;
c. Inspection jigs — accuracy to 0.0001 inches
d. Error correction, continuously monitor and correct mechanical errors in machine tools;
e. Mechanical installation and alignment tool;
f. Vibration analysis, frequency independent from zero to 20 kilohertz.

In addition to those general areas listed above, the invention is applicable to the following specific jobs:

1. The conventional measurement of tires;
2. Growth control of tires — to control the size of it so that at the last minute before the press closes it truly fits into the mold;
3. Turning equipment;
4. Error correction concept for any surface configuration.

The invention relates to an apparatus that will measure over a fairly large range. In tire testing for instance, it will measure over approximately a 10 inch range, in order to cover the difference in radius from the smallest to the largest size tires that are manufactured. The measurement range is virtually unlimited and may be easily established as required. For example, it could go to 10 feet if it were desired to have a range that large. The general idea is to start off with a very braod range of coverage to ascertain where the object is generally located and then shift the measurement down to a very precise resolution, for instance, starting from 10 inches reduced down to 0.0001 of an inch measurement.

OBJECTS OF THE INVENTION

The genral object of the invention achieves a measurement on the periphery of surface of an object and includes plural radiating energy sources and receivers that generate a plurality of adjacent radiation paths. By sequentially operating the transmitters in some defined order with logic control and determining the particular beam of many that is interrupted by the object being measured, this very basically reduces the total measured range or a coarse measurement to approximately one over the number of transmission paths between transmitters and receivers in the total measurement range. The particular beam or path that is obscured or interrupted along with the adjacent beams define the precise measurement range that is divided up into other parts to a resolution one one-thousandth inch for example.

A further object of the invention is to meet a requirement to describe the profile of the tire. This comprises taking a cross section and looking at it, ie, the tread, the sidewalls, etc. This includes a mechanical portion to move the beams or transmitted paths to circle around the tire whereby the output generated would then be the total profile. This is something that can only be done at the present time with the use of high speed photography. The concept of this modification to the invention would be to then rotate the plane and take measurements all the way as the beam rotates through the plane. This produces a dynamic output from a three dimensional figure.

A further object of the invention is to achieve an actual measurement range dependent on the geometry of the spacing of the transmitters and receivers. To this end, in the preferred embodiment of the invention, transmitters and receivers are spaced on 2/10 inch centers and separated from each other such that the distance half way between the transmitter array and the receiver array would be exactly one tenth inch. The beam paths defined between transmitters and receivers are in exactly adjacent relation with underlap or overlap at this midpoint position. Hence, any object positioned midway between the arrays and detected at the receiver would interfer within a particular tenth inch range at the midway measurement point. Therefore, it should be understood that the spacing between the transmitters and the receivers is an important part of the overall concept.

It should be noted that the actual measurement line in the measurement field may be established at any position between the TX and RX arrays by establishing the proper geometric relationships between the parameters such as TX's spacing, spacing between RX's, and TX RX mask dimensions. The most general case is that of allowing precise measurements anywhere within the field between the RX and TX arrays. Thus the basic concept of the VAM system may be utilized as required for a particular requirement.

A further object of the invention is to provide an apparatus used to determine measurement error correction using at least two beam paths, represented by at least two transmitters, and one receiver, or one transmitter and two receivers, representing a total range of two-tenths inch in the preferred embodiment. For coarse detection these would be sequentially fired to determine which path is interrupted and then for fine measurement the particular beam that is interrupted would be proportionally determined. This object os the inention is achieved by the total beams that are generated which give a total range represented by the product of the number of receivers times the number of transmitters.

A further object of the invention is to provide a better resolution caused by pulsing the transmitters with large powers to achieve five to ten times the power out of a conventional photo transmitter diode than can be produced in a constant beam from a standard one milliwatt neon helium laser beam and for less cost.

A further object of the invention is to be able to improve the proportional readout from the photocell. The normal output of the photocell which has something interferring between it and the light source is really not proportional. The invention includes a masking technique that causes it to be linear within itself over a wide range. The masking technique has decreased error from about 5 percent down into the 1 percent range. It is a means of effecting a more linear or proportional amount of light across the beam at which the receiver is looking. In general the prior art has considered the light source and the pickup focused to be a point also in the measuring area. This means that the measurement range is small. These are point source receiver types. Whereas with the instant invention the transmitter is an area illuminator and the receiver is an area receiver. The transmitters utilize a 2/10 inch on a side square emitter. The rceiver area is a 1/25 inch square. These sizes can vary, but for up to a 10 inch testing range for tires they have proven quite satisfactory. Hence, no optical requirements for focusing are necessary.

The foregoing objects of the invention, and other to become clear hereinafter are achieved by an apparatus to effect a non-contract measurement of a surface which comprises a source of radiation energy; means to detect said radiation energy positioned in spaced relation there to and cooperative therewith to define at least two separate substantially adjacent radiation energy paths between said source and said means to detect; means to sequentially actuate said paths and detect if any portion thereof is interrupted by an object extending thereinto, and means to determine the proportion of interruption of the path determined to be interrupted and represent this as a measurement signal.

For a better understanding of the invention reference should be made to the accompanying drawings wherein.

Figures 16A, 16B:
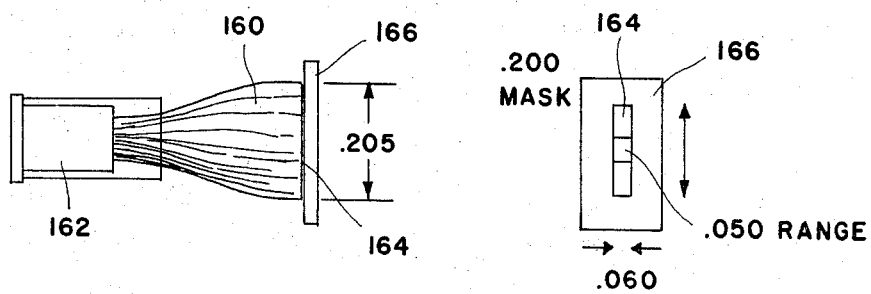
Figure 17:
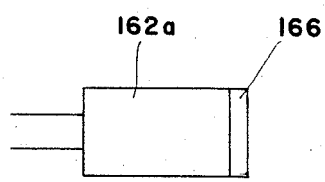
Figure 18:
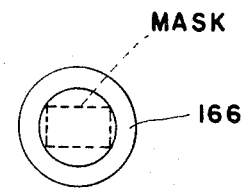

FIG. 16 A is a side elevational view of a light emitting diode transmitter incorporating a fiber optic bundle;

FIG. 16 B is an end elevational view of the fiber optic bundle of FIG. 16A, showing a mask used in conjunction therewith;

FIG. 17 is a side elevational view of a light emitting diode transmitter and mask; and FIG. 18 is an end elevational view of the transmitter and mask of FIG. 17.

GENERAL CONSIDERATIONS

Figure 1:
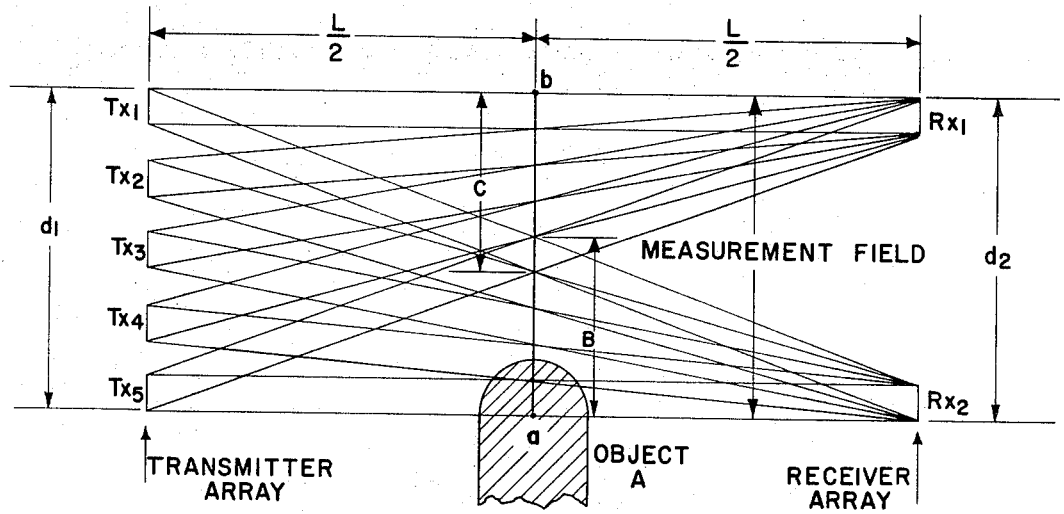
FIG. 1 is a schematic illustration of the principal of the preferred embodiment of the invention.

With reference to FIG. 1 the linear dimension $d_1$ is established equal to $d_2$. The dimensional relationship between $l$ and $d_2$ is $l >> d_2$, thus the angle of incidence of light from a light emitting diode transmitter hereinafter referred to as an LED transmitter is nearly identical (within the range of accuracy requirements).

A means of measuring the precise location of an object along the center line of the measurement field is accomplished as follows:

If the five LED transmitting diodes have a 0.1 by 0.1 inch transmitting surface and they are spaced on 0.2 inch centers in a line, and if the receiver diodes have a similar geometry of $0.1 \times 0.1$ inch, then the light path from any of the LED's to the receiver, as seen by the receiver will be 0.1 inch square. Thus at the center plane ab which is located in the exact midpoint between the transmitter and receiver planes the light paths (or beams) from the five LED's will be tangent and will cover an exact linear measuring range of 0.5 inch (5 paths $\times$ 0.1 inch). By utilizing a second receiver as shown, and by selecting the appropriate receiver to use, the linear measurement distance increases to 0.9 inch. The total linear measurement range becomes $MR = 0.1 \, xy - [xy - (y-1)] = 0.1 \, [y \, (x-1) + 1]$ $MR$ = measurement range in inches $x$ = number of transmitters (LED's)

$y$ = number of receivers and $x \neq 0, y \neq 0$

In the sketch, assume five transmitters and two receivers are used as shown. As an object (OBJECT A) moves into the measurement field along line ab various light paths will be interrupted or partially obscured. By determining which light path is partially obscured and the amount by which it is obscured, the precise position of object A along line ab in the measurement field may be determined. A combination of multiple transmitters and multiple receivers along with electronic controlled sequential selection and operation make possible a wide measurement field with very accurate measurement with-in the field.

The sequentially controlled operation of the transmitter and receiver arrays allow three levels of accuracy; coarse, fine, and precision.

*Coarse measurement* is accomplished by first electronically monitoring the output of receiver number one while sequentially firing the LED's. (turn on then turn off TX 1 and then TX 2, etc.) If object A is in the portion of the measurement field shown as c in FIG. 1, then as the LED's are sequentially operated, receiver RX 1 will have an expected output. If there is no missing output from receiver RX 1 then receiver RX 2 is selected temporarily and the transmitters are again sequenced. If an expected receiver output is missing, or partially, the object A is in the portion of the measurement field shown in FIG. 1 as e. Receiver RX 2 would then be selected for the measurement. If object A is not found to be in sections c or e of the measurement field, that means that an object does not fall into the total field available and hence the test is aborted.

*Fine measurement.* Once a receiver is established, the position of object a is known to within 0.5 inch. If 20 transmitting diodes were used (0.1 inch beam, 0.2 inch centers) with three receivers, the position of object A in the measurement field along line *ab* would be established to within 1 inch out of a total measurement range of 5.8 inch. The particular receiver is then monitored while the transmitters are again sequenced. By monitoring the receiver output as the transmitters are sequentially fired and comparing the receiver output with the known full scale (no interference of light path) and zero scale (full interference of light path), the particular transmitter (LED) that causes a partial receiver signal (partial interruption or interference of the light path) output is known. Knowledge of which LED caused a partial receiver output (monitored by a digital counter) now places the position of object A in the measurement field to within a particular 0.1 inch segment along line $ab$. The combination of receiver selection (coarse measurement) and LED selection (fine measurement) has now located the position of object A to 0.1 inch out of a total measurement range of 5.8 inch.

*Precision measurement* Precision measurement is obtained by determining the ratio between the partially obscured (proportional) output and the full range output (full scale minus zero scale). This proportion represents a percentage of obscurity of a particular light path. This proportion is scaled 100 units, thus effectively dividing 0.1 inch into 100 parts for a resolution of 0.001 inch out of a total measuring range of 5.8 inch. Although the previous discussion for the sake of example and clarity used a stationary part (object A) for test, it should be recognized that the sequential control and comparator electronics can perform the entire test very rapidly (in less than 100 $\mu$ sec.). As a result, continuous motion such as rotation of a tire at moderate rates may be monitored and measured in the field.

Figure 2:
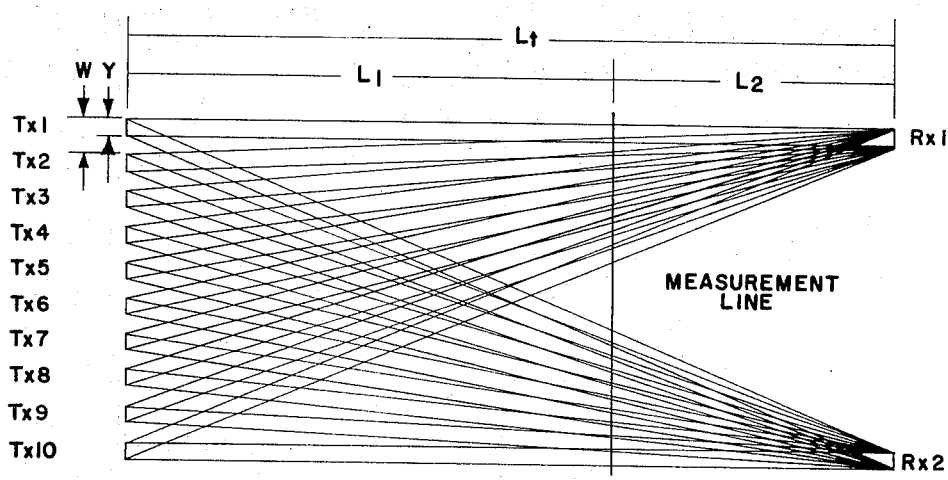
FIG. 2 is a schematic illustration showing how the measurement line can vary between the transmitters and receivers.

As seen in FIG. 2, by varying the ratio of transmitter surface to transmitter spacing, the position of the measurement line can be controlled. Generally $$w/y = l_2/l_1$$

where
 $w$ = transmitting surface
 $y$ = transmitter spacing
 $l_1$ = distance of measurement line from TX
 $l_2$ = distance of measurement line from the receiver plane

SYSTEM ATTRIBUTES

1. It is obvious that transmitters (TX) and receivers (RX) may be interchanged in position. The total number of beams generated is the product of the number of TX and RX. Each individual unit may be either a TX or RX unit even within an array as long as the proper electronics is provided.
2. Two modes of operation of the system concept are:
   a. linear continuous measurement within the measurement range. Accuracy over a relatively large range with no moving parts. 0.001 inch over 10 inch for instance. Unique for non-contacting measurement.
   b. incremental measurement within the measurement range accuracy is ± BEAM SPACING within the measurement.

BASIC CIRCUIT BLOCK DIAGRAM

Figure 3:
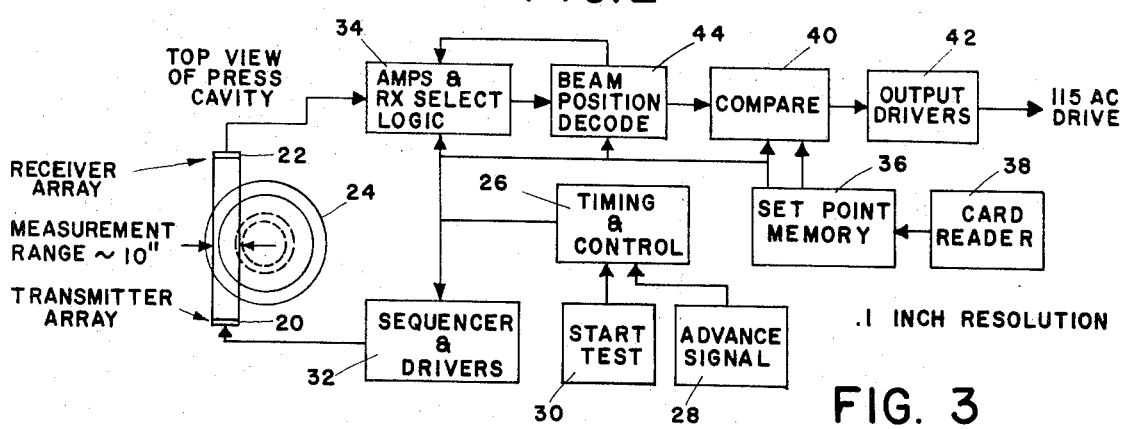
FIG. 3 is a general block diagram of the overall system approach.

FIG. 3 is a system for a 1/10 inch resolution range and specifically it is to monitor the growth of the object in the field and monitor it against set points such as might be brought in by switch positions or some other means. It is not designed for proportional measurement to obtain extremely fine resolution. It includes a transmitter array 20 facing the tire press 24 through the cavity. There is an opening in the cavity shield so the transmitters 20 and receivers 22 can look through the cavity at the tire inside.

The starting point is the timing and control indicated by block 26. The inputs of advance signal 28 and start test 30 to the timing and control 26 come from the machine control itself telling this unit when to start monitoring a tire within the measuring range.

These signal 28 and 30 come from the machine control system. When they are ready to start closing the press then they would give the start test signal 30. The timing control 26 initiates the sequencer and drivers indicated by block 32 to sequentially actuate the transmitter array to selectively cooperate with one receiver, and to pass through the coarse and fine measurement scheme as more specifically defined above.

The beams from transmitter array 20 are received by the receiver array 22 and go to the preamps and receiver select logic block 34. The receiver select logic 34 is also operated by the timing control system 26. In this manner the exact position of the object is determined and presented as a signal. This signal then is compared with a set point memory 36 such as a card reader 38 or other suitable device. For instance, with a card reader we would read off one column of the card in the first part of the test and compare the position and then we would put out an output signal telling the machine controller whether to put more pressure into the tire to expand it out to that position or less pressure to let it deflate down to that position. As the test progresses with the advance signal from the main controller setting forth new set points continuously the tire is properly controlled in size to the exact required configuration as the press is closing. This is accomplished by comparing actual position of the tire with a required position from the set point in memory in the comparitor 40 and operating the output drivers 42 to control the air valves that administer air pressure into or out of the tire as it is going to the curing press or some other operation.

The timing and control signal also comes up as an input to a beam position decode block 44 and the comparitor 40 and the set point memory 36.

TIMING AND CONTROL BLOCK 26

The timing and control block 26 first of all, in conjunction with the beam position decoder 44 operates to select a particular transmitter 20 to be used at a specific time in the test, or a particular time in the press closure cycle. The timing control 26 also steps to the proper position on the set point in memory to read out the proper position and then enables the comparison to be made to operate in the output logic.

PROPORTIONAL MEASUREMENT SYSTEM

Figure 4:
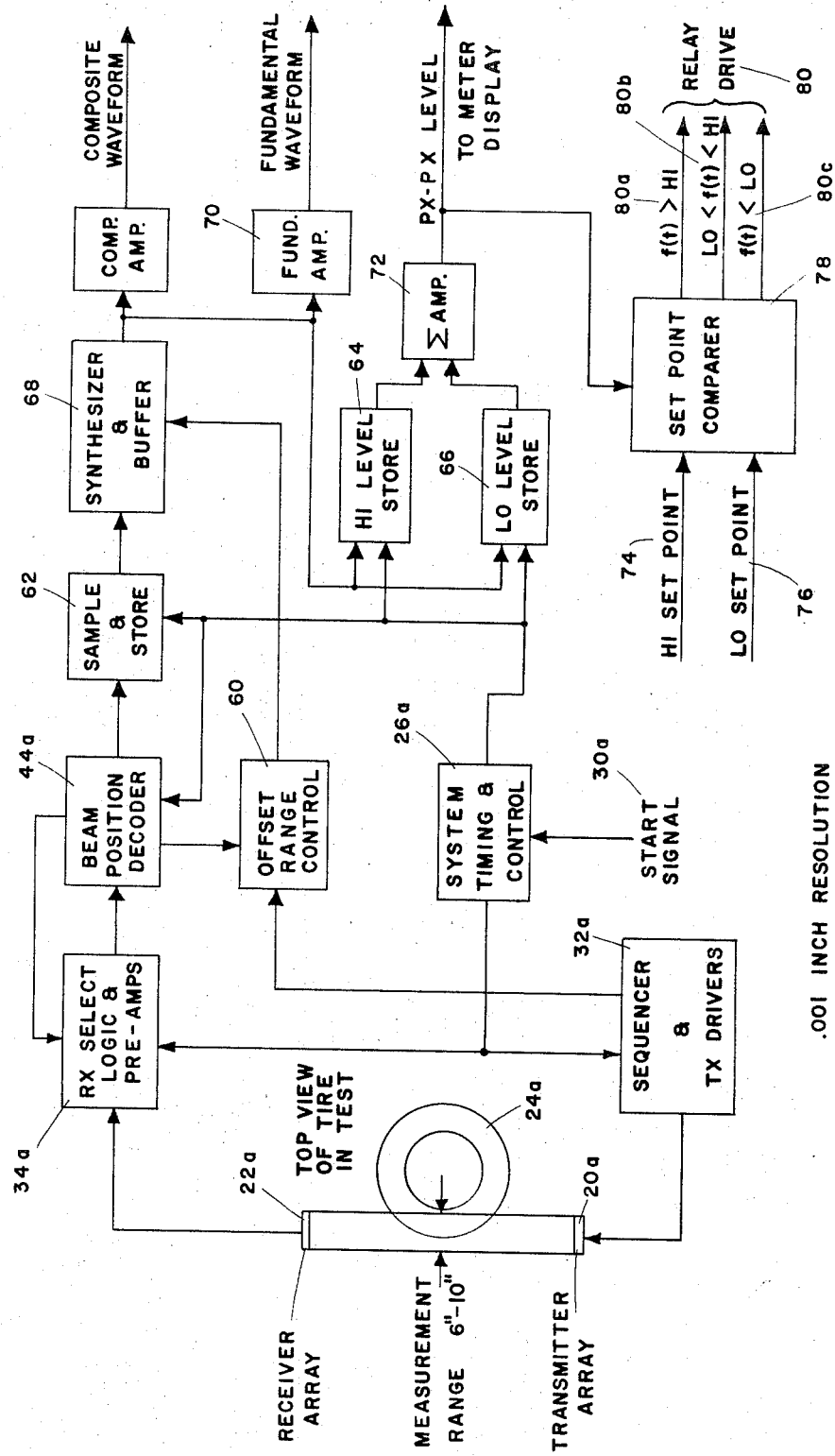
FIG. 4 is a general block diagram of an overall system approach with proportional determination included.

The block diagram of FIG. 4 is for a non-contacting linear measurement system capable of measuring a surface position to within one one-thousandth of an inch resolution. Similar blocks are given the same number as in FIG. 3 with the suffix $a$ added. The system includes a timing control 26a and the input to this is a start signal from some overall machine controller.

The timing control is set for each particular system requirement. It is variable for each particular use based on the geometry of the machine, what has to be measured, and what measurement range is desired. That in turn describes the number of transmitting diodes, the number of receivers which in turn defines the timing control needed. Very simply it is dependent on the number of light to trigger, and the number of receivers cooperating therewith, or in effect the number of beam paths needed to cover the range desired.

The system includes a start signal 30a from the main machine controller that starts the system. The timing control operates the sequencer and transmitter array driver to sequentially pulse the transmitter array. A receiver array is included, and the receiver where measurement is being made is logically selected by the controller system timing control. One receover may be completely obscured under the test all the time and one receiver may never be obscured by the particular tire size, but the logic selects the receiver or receivers which allows the system to operate generally in the middle of the transmitter array. The system further includes a logic selet 34a and receiver preamps for the receiver 22a, and this feeds over to a beam position decoder 44a which is fed into an offset range control 60. There is also an output from the transmitter drivers 32a into the range control 60.

Figure 14:
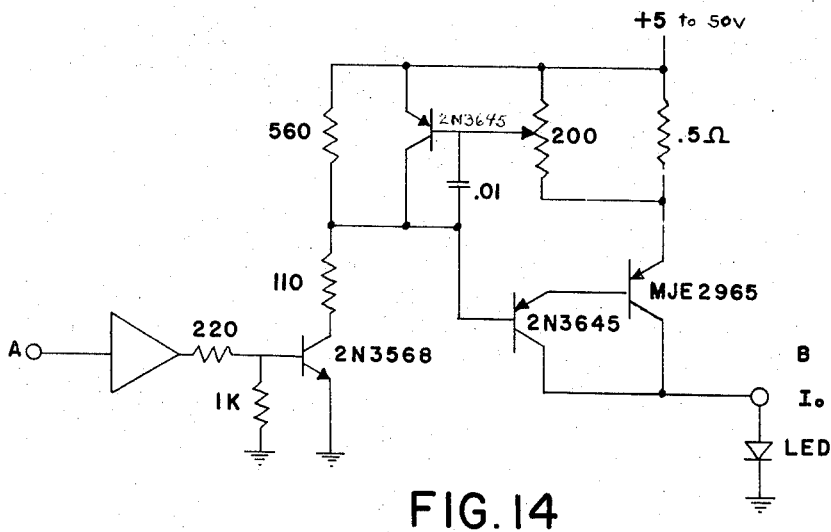
FIG. 14 is an electrical schematic of the LED Driver Block of FIG. 5.

Hence, it should be understood that a crude or coarse offset is determined by the receiver position of the decode block 44a, a fine or medium range offset from drivers block 32a and a proportional determination for extremely fine resolution is added by the sample and store block 62 in FIG. 14.

Block 62 feeds set points into high level and low level store blocks 64 and 66 respectively. The same positions are fed over with proportional parts into a synthesizer and buffer 68 and come out to produce a full range signal which is composite. The composite in this particular instance is fed to a fundamental amplifier 70 which is a straight forward low pass active filter, although it could be some other suitably electonic equivalent. The same composite wave form is then fed to the high level and low level storage blocks 64 and 66 for comparison and up date, and then the output of these are fed to a summing amplifier 72 which gives a peak to peak range of the signal, or a peak runout.

The peak to peak runout is compared to set points 74 and 76 from a set point comparator 78 which produces in this particular instance, three output signals directed generally as the relay drive 80. The high signal 80a indicates that the runout is higher than the highest set point 74 which means that it is an out of limit tire. The signal 80b indicates the runout is between the two ranges which means a tire that could be acceptable, but not a good tire. Then if the signal 80c is actuated it means that the runout is less than the lowest at that point which means that it is a very good tire. Hence, it can be seen that dependent on the set point actuated the tires can be graded into classes.

SEQUENCE OF OPERATIONS OF THE PROPORTIONAL SYSTEM OF FIG. 4

Upon actuation the timing and control selects a receiver. Then all transmitters are sequentially fired. If the receiver did not receive an expected beam, that means that the object has interrupted the beam, and the proper measurement receiver is now selected. However, if the system sequences through all transmitters and every expected beam was there it means that the system must logically move to the next receiver and select that measurement. Once a specific receiver has been logically selected the system ripples through the transmitters again and determines which one of those is the one that fired when the expected beam was not there. Now the system knows that it has selected the proper receiver, and that it has determined a particular transmitter where the beam is partially obscured or interrupted when the transmitter is actuated. Now the system takes that beam and looks at it proportionally. This completes the three step operation, although it should be understood that the system may do this in one pass. It is the logical sequence that is followed, but implementing the function may be accomplished in various ways, one typical one of which will be described in greater detail hereinafter (with reference to FIGS. 5-15). The system is designed to effect complete measurement once every milisecond, although this time may be altered to conform to a particular system requirement.

BASIC SYSTEM BLOCK DIAGRAM OF FIG. 5

Figure 5:
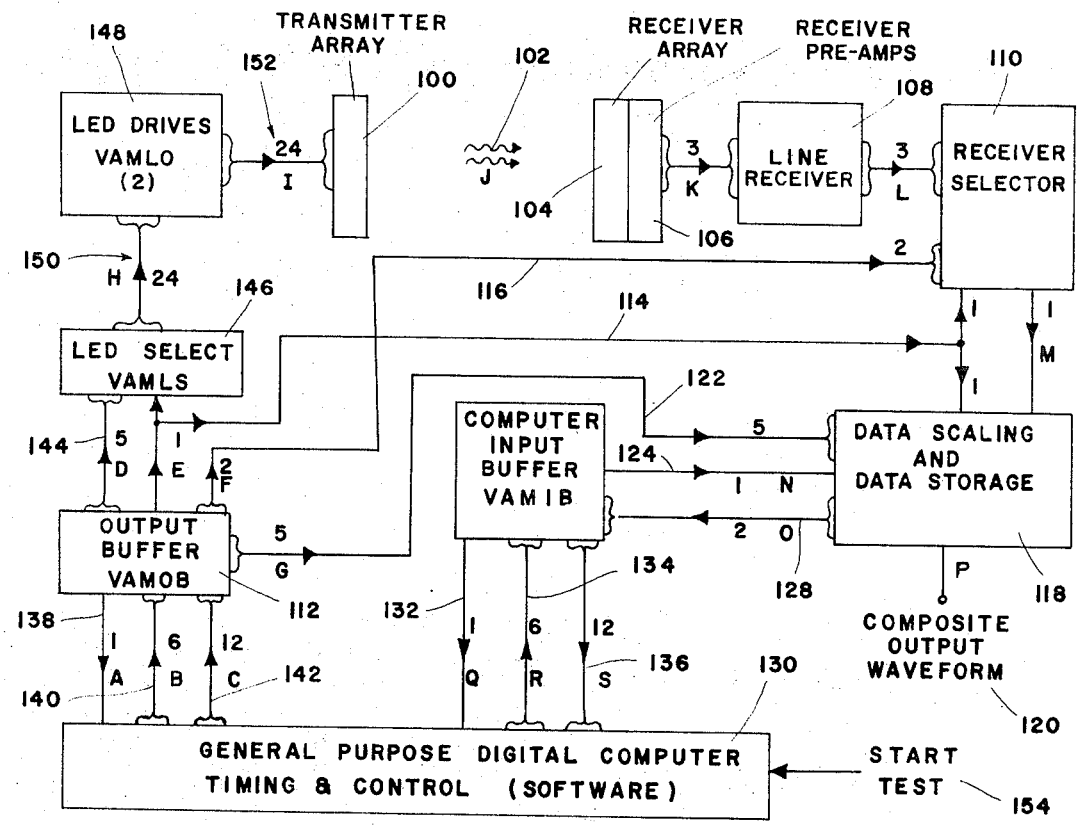
FIG. 5 is a general overall block diagram of the particular circuitry necessary to accomplish the preferred embodiment of the invention.

The basic system as illustrated in FIG. 5 comprises a transmitter array 100 sending a radiated signal 102 in the form of infra-red energy to a receiver array 104. The receiver array directs its signals into a receiver preamp section 106 from which signals are sent out into a line receiver indicated by block 198. The output from the receiver block 108 is fed as an input into a receiver selector and indicated by block 110. The receiver selector 110 also receives two inputs from the computer output buffer section indicated by block 112, with one of these inputs coming over line 114, and one over line 116.

The output over line 116 from the buffer 112 is also fed simultaneously to the data scaling and data storage section indicated by block 118. The selector section 110 also provides an input into section 188, which provides composite output wave forms indicated by numeral 120. Inputs to section 118 are also provided over line 122 from the output buffer 112, and over line 124 from the computer input buffer indicated by block 126. The data storage section of block 118 also provides an output over line 128 into the input buffer section 126.

The input buffer section 126 associates with a general purpose digital computer indicated by block 130 in which timing and control accomplished by proper programming takes place. The communication between buffer 126 and computer 130 is over respective lines 132, 134, and 136. The communication between the computer 130 and the output buffer 112 is over respective lines 138, 140, and 142.

The output buffer section 112 also provides an input over line 144 to the LED select section indicated by block 146, as welll as the same input as over line 114, as clearly shown on the block diagram. Block 146 communicates with an LED driver section indciated by block 148 over a plurality of input lines indicated generally by numeral 150. The driver section 148 communicates with the transmitter array 100 as indicated by a plurality of lines indicated generally by numeral 152. A start test signal is indicated by block 154 and it communicates with the computer 130.

The relation of the signals between computer 130 and the buffers 126 and 112 will now be described in more detail. Particularly, signal 138 is from the buffer 112 to computer 130 to indicate completion of data transfer from the computer to the buffer 112. The signal 140 is indicated as a plurality of signals from the computer 130 to the buffer 112, and these are address signals as will be defined more fully hereinafter. Signal 142 again represents a plurality of signals from the computer 130 to the buffer 112, and these are data line signals to be more fully defined hereinafter. Line 144 carries a plurality of signals as address lines to the LED select section 146. The signal over line 114 is a pulse signal to turn on the selected light emitting diode to the receiver selector 110 to synchronize the data sampling, and to the data scaling and data storage section 118 to synchronize the data processing. The line 116 is sent to the section 110 to select the specific receiver photo transistor. Line 122 represents a plurality of address lines to the data scaling and data storage section 118 to select the particular transmitter-receiver offset.

Line 132 is from the input buffer 126 to computer 130 and carries a signal indicating the completion of data transfer from the section 126. Line 134 represents a plurality of address lines and line 126 represents a plurality of data lines from the input buffer 126 to the computer 130. Line 124 is a transmitter offset load connected to section 118 while line 128 carries the output signal from section 118 to the buffer 126.

RECEIVER PRE-AMPS

A number of preamps located in the receiver array are equal to the number of light receivers. In other words, there is one pre amp for each light receiver. The receiver array indicated by numeral 106 in the block diagram of FIG. 5 utilizes a photofet or photo field effect transistor such as the type P-238 manufactured by Siliconics, Inc. of Santa Clara, Calif. This particular cell has a fast infra-red light response characteristic with a high output electrocal signal. The high speed with some amplification is desirable in the overall circuit operation.

The actual physical arrangement of the photofets in spacing and masking is described elsewhere in the specification.

Figure 6:
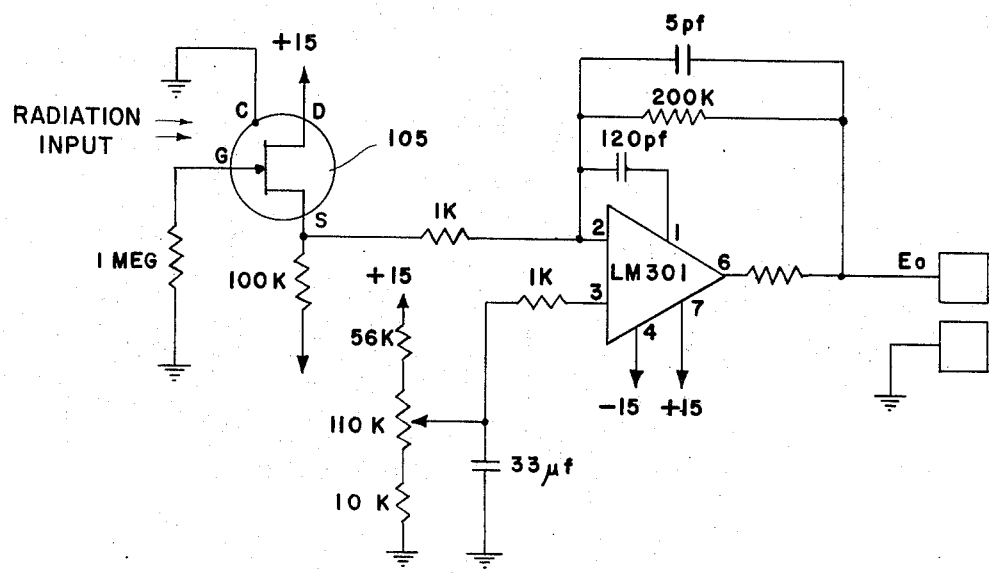
FIG. 6 is an electrical schematic of the receiver array pre-amps of FIG. 5.

There is a specific pre-amplifier for each photofet. In order to simplify the description of the specification, only one amplifier is described. The actual circuit diagram of the pre-amplifier is shown in FIG. 6. Basically it consists of an LM 301 amplifier produced by National Semiconductor Corp. of Santa Clara, Calif. It is an operational amplifier circuit utilizing a straight amplifier design, with feed forward to increase its speed. Basically this type of amplifier is within the state of the art, and the circuit diagram of FIG. 6 is self explanatory to one skilled in the art.

On the noninverting input 3 a voltage from a 20,000 ohm potentiometer is applied to balance the voltage coming from the individual photofet. Since the photofets tend to have different characteristics, this adjustability is desirable.

As shown in FIG. 6, the photofet indicated generally by numeral 105 contains four inputs with S indicating the source, G the gate, D the drain, and C the case or shield. A 15 volt input is applied at the D terminal and the gate is grounded through a one megohm resistor. A minus 15 volt source is applied on the S terminal through a 100 K resistor. In this instance the signal is actually light or infra-red radiant energy impinging on the gate structure of the device rather than an electrical signal being fed into the gate terminal G. The invention contemplates that any photocell might be utilized, but this photofet manufactured by Siliconics has a desirable response characteristic that is fast and produces the high electrical output as indicated previously. It should be noted, however, that any sensor which will meet the response characteristics needed for a particular system could be utilized.

As mentioned above, however, an infra-red system does seem to provide a higher output. Hence, the system described above utilizes filters on the sensors and the transmitters so that only infra-red energy is utilized as this tends to be more impervious to atmospheric conditions such as fog, smoke, haze, etc. which are more troublesome with a visible light source.

The remainder of the preamplifier utilizes 120 picofarad and 5 picofarad capacitors around the amplifier for higher speed with the feedback characteristic. The 10k potentiometer is utilizied to adjust for the actual characteristics of the particular cell 14 so that the output from the S terminal of the cell represents the desired output from the particular beam associated with that cell at any instant of time.

BEAM CONFIGURATION

Figure 7:
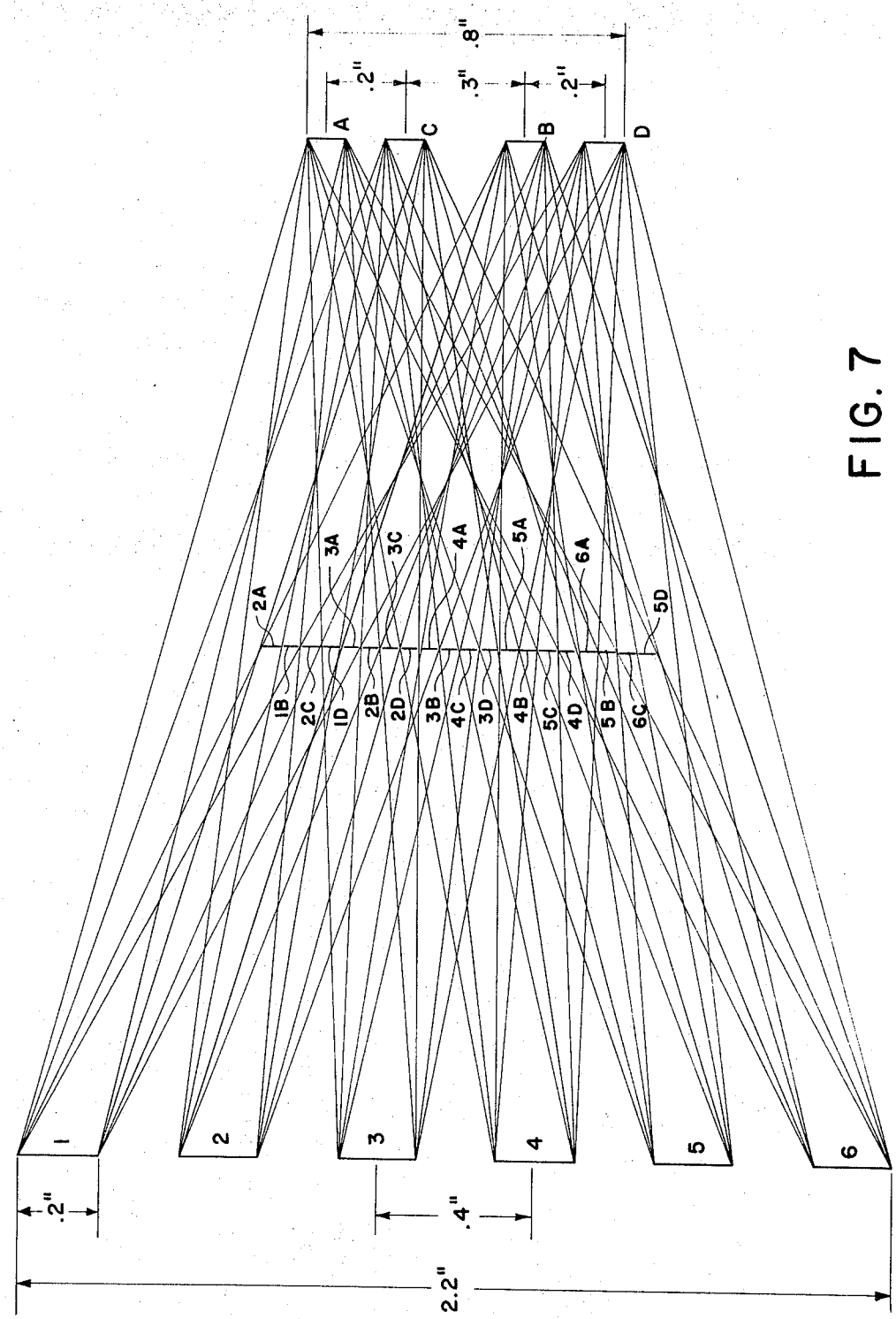
FIG. 7 is a graphic illustration of the exact radiation pahts used in the embodiment of FIG. 5.

Referring now to FIG. 7, the design of the beam configuration will be explained. Essentially, it consists of six light emitting diodes labeled 1 through 6, and four photofets labeled A through D. This then consists of 24 beam paths as the number of receivers multiplied times the number of transmitters ($4 \times 6 = 24$). The transmitters an receivers are spaced so that the transmitters are 2.2 inches from top to bottom with .4 inches between centers, each one sending out a 0.2 inch times 0.2 inch square beam path by being masked to that configuration. The receivers cover a distance 0.8 inches with a 0.080 inch square mask.

We have found that the side areas of each beam path tended to be non-linear, but that the middle third of each beam was substantially absolutely linear with the masking techniques. As a result, we descided we would use the middle 0.050 inches of each beam path. Hence, to define a 1.0 inch measurement area exactly midway between the transmitters and receivers, and in measuring 0.050 inches on each beam path, the measurement sequency is indicated as 2a, 1b, 2c, 1d, 3a, etc. as is indicated in the figure. With this technique we are using 0.050 inch beams that are exactly linear and exactly touch each other at their lateral edges at the midpoint between transmitters and receivers. The whole reason for doing this was because we wanted to get exactly linear characteristics at the center of the beams. Further, by allowing the spacing between the transmitters and the receivers, it eliminates the mechanical problems of placing these in exact alignment, because of the size of their housings, and the like. Hence, none of the receivers or transmitters have to be off set, and the exact linear characteristic of the receivers by the measuring portion of each beam is thus determined.

If the receivers exactly touched each other, the beams could be measured a, b, c, d. However, since physically there isn't room to mount the receivers, the receivers are not actually sequentially sampled in order to obtain the sequential sampling of the 0.050 inch sections of the beam paths labeled in the drawing.

The system of ordering is no problem as those beam numbers are simply designated in the computer at proper beam addresses and the sequence is thus properly ordered.

LINE RECEIVER 108

It must be understood that the output from the pre-amps on the receiver arrays consists of a series of electrical pulses as the light emitting diodes are seqeuentially activated. This is quite important to the operation of the particular circuit. Looking at the circuit in FIG. 8, we have a first section of two resistors and two capacitors. This is where the $E_o$ input comes from the receiver pre-amps of FIG. 6. The resistors and capaciors comprise a low pass filter and it is for the particular purpose of eliminating noise above about 10 kilohertz frequency.

The circuit includes 0.82 capacitor. As stated above, the light is coming in a series of pulses. During the time when the light is not pulsed, an input signal over the 3.0 volt pin grounds the right side of the 0.82 capacitor through transistor 2N3568. It should be understood that during the time a specific light beam is not being pulsed into the particular receiver, it is subject to ambient light. This technique of grounding through the 2N3568 transistor charges the 0.82 capacitor up to the value of the ambient light. Hence, when a light pulse comes in, the 2N3568 transistor is turned off, and hence the voltage on the right hand side of the 0.82 capacitor consists of the total light in the receiver minus the ambient light, or in effect just the light from the light beam transmitted thereto. Hence, the combination of elements comprises an ambient supressor circuit. The input to the 3.0 V pin comes from a pulsing voltage generator at the time that the particular LED is fired, and it comes from the output buffer section over line 114 to be more fully defined later.

FOllowing the ambient supressant circuit, a straight forward line receiver amplifier is provided. It should be understood that the pulse at point A is there at the instantanious time that the beam path is activated. This is a quite important circuit system operation, because it provides that the system is not sensitive to changes in ambient light. The only criteria, of course, is that the ambient light has to be there for a certain period of time prior to the beam path being activated so that the 0.82 capacitor can be charged up to the proper value representing the ambient light condition. Further, the ambient light has to be within the range such that the voltage coming out of the pre-amp or the $E_0$ signal does not exceed the limits of the 0.82 capacitor and its associated circuitry.

The 2N3568 transistor really acts just as a switch which in effect grounds the right hand of the 0.82 capacitor during all time except when the particular beam path is actuated and the full 3.0 volt pulse comes in and in effect opens the transistor so that the actual voltage generated is represented at point A as the exact signal picked up by the sensor without any regard for the ambient light condition.

It is further important to the operation of the system that the pulses of light be relatively short in time so that the system again is not sensitive to changes in ambient light. In other words, if the ambient light changes at a rate corresponding to the pulses, then the system will not be immune to ambient light. Therefore, the shorter the pulses are the better and more efficient the system will operate.

The right hand side of the line receiver is a relatively straight forward, high response pulse amplifier similar to the pre-amplifier of FIG. 6. It utilizes a potentiometer adjustment on the 20K resistor to adjust for zero voltage out of the LM 301 amplifier, under ambient conditions. The 20K potentiometer adjusts for voltage offset so that the voltage output at pin B would be zero with no pulses through the amplifier. The one megohm potentiometer adjusts the drift of the amplifier to a minimum. The pair of 30 picofarad and 120 picofarad capacitors with the 1k and 220 ohm resistors form a capacitor-resistor network to achieve a feed forward compensation of the amplifier. The 20K adjustable potentiometer in combination with the 10 picofarad capacitor provide a feedback gain adjustment control to achieve the appropriate match of output voltage at pin B to the other similar line receivers. o, Hence, it should be understood that the output from the preamplifier circuit at pin B is a more fully amplified signal than the pre-amp output signal $E_n$ which was an input.

Figure 8:
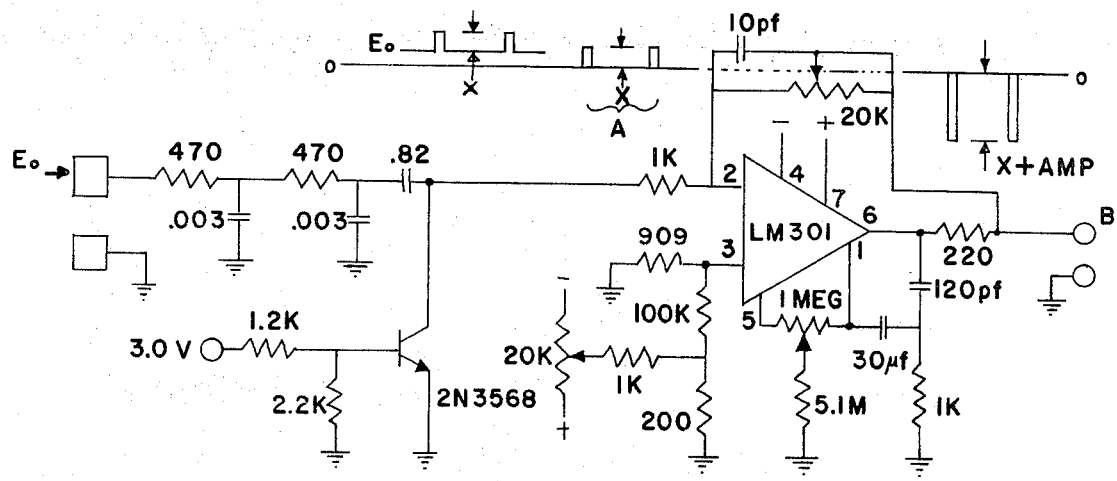
FIG. 8 is an electrical schematic of the line receiver block in FIG. 5.

Actual voltage pulse wave forms associated with FIG. 8 are illustrated thereon showing that the $E_o$ input signal is above a zero or median voltage level because of ambient light conditions. However, the voltage pulses at point A, while not being amplified are reduced to a pulse from the zero level. The voltage pulses are inverted and amplified but measured with respect to the zero level at the pin B output, as indicated.

RECEIVER SELECTOR

Figure 9:
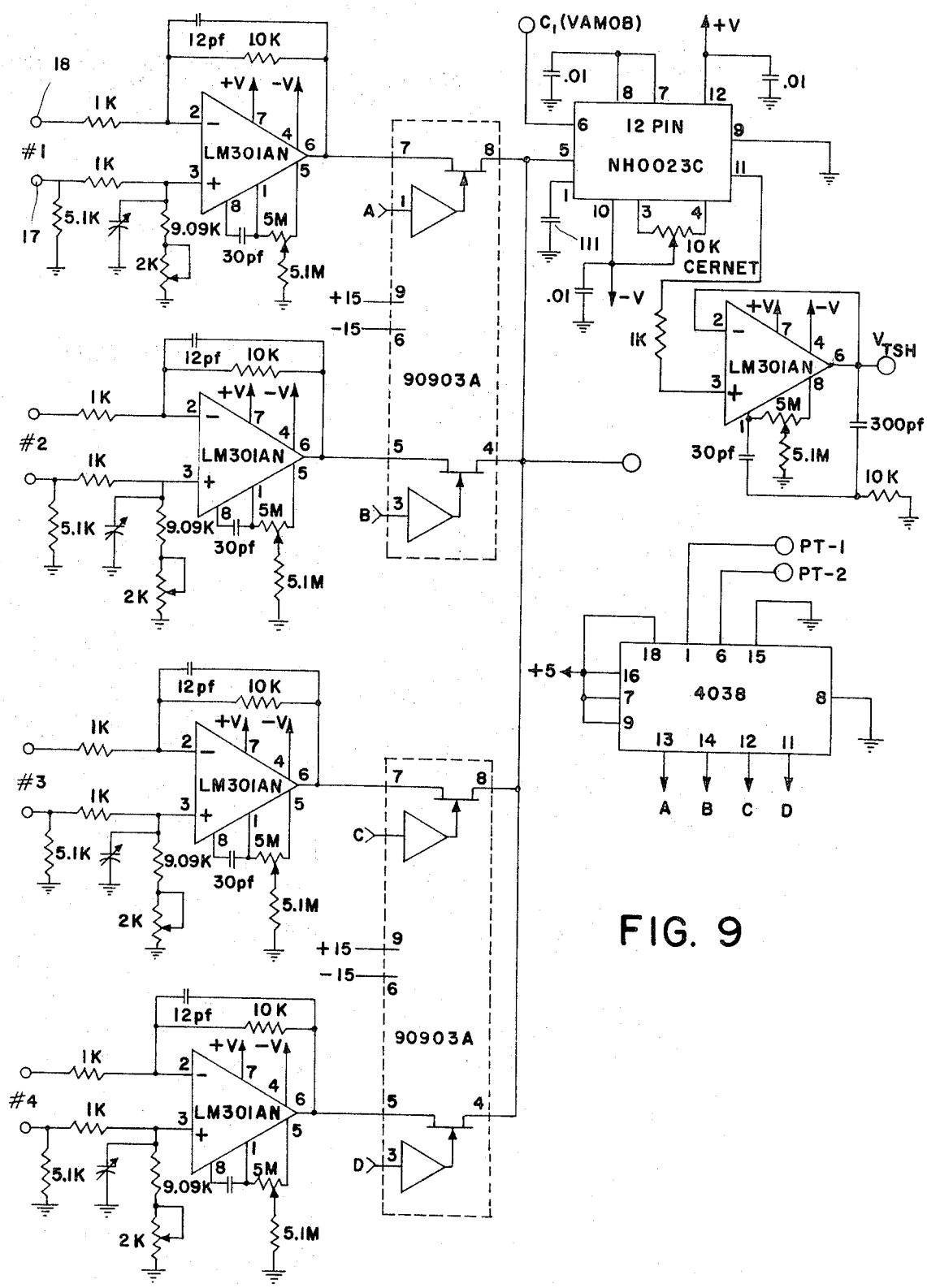
FIG. 9 is an electrical schematic of the Receiver Selector Block of FIG. 5.

The receiver selector block 110 is indicated in circuit diagram form in FIG. 9. It consists of four receiver buffers, one for each receiver, but only one receiver buffer will be described in detail to avoid repetition and unnecessary descriptive material. It should be understood that all buffers are the same, however.

The output from pin B of the line receiver preamp corresponds to the input at pin 18. The signal is amplified by the LM 301 AN amplifier which provides a 10 to 1 gain. The output of the amplfier is really a pulse which goes to a negative level and recovers to zero voltage, as is indicated by the voltage pulse signal shown as an output thereto.

The particular receiver being selected is accomplished by an analog selector or analog multiplexer consisting of two packs of 90903a dual channel gates, such as produced by Dickson Electronics Corporation, of Scottsdale, Ariz. As seen each 90903a cooperates with the respective amplifiers, in the manner clearly indicated by the block diagram to control A, B, C, and D switches associated with the respective amplifiers. The A input for example between pins 7 and 8 from the top LM 301 AN amplifier incorporates a driver associated with the switch, and comes from a 4038 decoder. The decoder is indicated at the lower right hand portion of FIG. 9. It takes its input address either PT1 or PT2 and resolves it into either the A, B, C, or D address. The input PT1 and PT2 signals come from the output buffer over line 116 to be more fully described hereinafter.

Assuming that the computer timing controls section says that the system is to look at receiver 1 beam 1, the address would come out of the computer advising to utilize transmitter 2 and receiver a. At that point a binary signal would come in over PT1 and/or PT2, with the particular binary signal sequencing gate a. At the same time the appropriate light emitting diode would be actuated through a similar circuit to be more fully described hereinafter.

The activation of switch A between pins 7 and 8 happens in a steady state condition. That is, the switch is activated for a considerable length of time between the time the light emitting diodes acutally operated. In other words, the switch itself is activated or turned on before the LED's This gives the system time to be stabilized before the voltage pulse is transmitted there through. Preferably, this pre-turn on would amount to at least 10 or 20 microseconds. Naturally, then the switch does remain closed after the LED is fired until the computer sends a new order signal via PT1 and PT2 to activate the next appropriate switch. The voltage appearing on pin 8 then is applied to a temporary data sampling and holding circuit that is the NH0023C. This unit is produced by National Semiconductor Corporation of Santa Clara, Calif., but other companys producing similar units would be suitable, also.

The NH0023C sample and hold unit is controlled by input C1 from the output buffer. This input signal activates the sample and hold unit, and it is turned on at the same time the beam is actuated so that as each pulse is produced this unit is commanded to sample. At the end of the beam pulse the unit is told to hold, and hence it maintains whatever voltage happens to appear at pin 8. In effect, the signal in on the C1 pin is the reverse of the 3.0 V signal on the line amplifier of FIG. 8. Hence, whenever the pulse occurs, it tells the NH0023C to sample, and whenever the pulse is off, it holds. The output of the sample and hold from pin 11 goes through a buffer amplifier LM 301. A storing capacitor 111 is connected to ground off the 1 pin of the sample and hold so that while the unit is holding, leakage to the capacitor is not a factor in maintaining the voltage.

The buffer amplifier LM301 is a moninverting type so a negative voltage signal is the result from the $V_{TSH}$ pin. The remainder of the circuitry on the sample and hold and the buffer amplifier is all conventional and well understood by one skilled in the art.

Now, assuming that there is no voltage appearing on the output from pin 11 one would see the output voltage drop during the pulse to that level and then after the pulse disappeared it would stay there. Now if the new pulse is different, the output would change to the new pulse so the output now becomes more of a step operation than a series of pulses. If the receivers are seeing a full light beam, then the output should be the same and a line corresponding to a negative output voltage is detected at pin 11 as this signal would be viewed on a CRT. Hence, it is only when a particular beam path is partially interrupted that a partial step up from the negative voltage level towards the zero level occurs, all this being illustrated schematically above the NH0023C in FIG. 9.

DATA SCALING BLOCK 118

The output from the receiver selector block 110 or signal $V_{TSH}$ is an input at pin R to the input of the scaling analog multiplier 117. The requirements of the analog multiplier 117 would be to have three operational inputs X, Y, and Z and the output being $E_o$. This particular unit is made by Analog Devices, Inc. of Norwood, Mass., but companies such as Motorola make a quite similar device.

As an important part of this circuit, the $R_o$ input is fed back into the X input via the block DATFS to generate a system calibrate on the zero or calibrate beam. A zero or calibrate beam address signal comes in on in W and acts through the DATFS sample and hold circuit to force the DATFS to assume the zero value with the calibrate beam, thus sending an input from point 5 back as the X input to the multiplier 117 so that the output signal at $E_o$ of the multiplier represents the calibrate beam. In effect this represents storing the full scale value of the beam, or in effect an uninterrupted beam. By definition to operate the system correctly, we have to have one beam that is uninterrupted. Now this voltage represents a beam calibrated to eliminate the effects of fog, haze, smoke, etc. Hence, on each sweep through the beams, the computer sends a signal to pin W to recalibrate the system for the zero or calibrate beam, which in effect then recalibrates the system for the atmospheric conditions on each sweep through the beam paths.

The output of the DATFS at point 11 if fed beck to the X input at point 6 of the multiplier. This means that the multiplier acts as a divider as the input from pin R is actually divided by the input at point X to produce a scaled output at point $E_o$ which is set at a predetermined 10 volt value, regardless of what signal is coming in on pin R. This is accomplished by dividing a negative voltage coming in pin D by negative voltage stored at X or negative divided by negative results in a positive, and it will be the same level as long as it is being commanded by the voltage at pin W. Hence, it should be understood that as long as the input pulses to pin R are substantially the same, regardless of their actual voltage, the fact that they are likewise inputs to the DATFS, and then pass in at point X, an automatic plus ten volt output at $E_o$ results. Typically the input voltage for the zero beam or the first beam can range anywhere between 2 to 8 volts, and this system can be calibrated to obtain this range in accordance with the particular beam path strength and the particular amplification within the receivers and the preamps before pin R.

Thus, it should be understood that the voltage representative of the actual value of the beam is stored in the DATFS, which is representative of the atmospheric conditions and the actual beam strength.

The remainder of the data scaling and data storage section comprises comparators A5 and A6 each feeding into respective inverters A7 and A8, which cooperate with AND gates A9 and A10 respectively. Comparator A5 receives a direct input from the $E_o$ output of the multiplifer, and a voltage reference, which is set so that if there is less than one per cent difference between the reference voltage Vref and $E_o$, a signal is transmitted through the inverter A7, and into the AND gate A9 thereby sending a scale signal back into pin 6 of the DATFS and in effect setting a new scale value to go through the dividing operation from pin 11 back into the X of the multiplier as described above, thereby insuring that the system is constantly upgraded and scaled for each successive beam if it falls within 1 percent of the input voltage to pin R. Hence by definition, the beam is unobscured if it is within 1 percent of the previous beam, and each previous beam is used to update the calibration for each successive beam.

Now, if a beam is partially obscured, the signal $E_o$ will not activate the omparator A5 because the difference between $E_o$ and Vref will be of greater than 1 percent in amplitude. However, comparator A6 is set to determine whether the signal obscuring falls within the middle .050 inch of the beam or not. If the beam is within tis useful range then A6 is actuated sending a signal into Inverter A8, and into AND gate A10 where it is gated out through pin 15 as a signal that data is present on this beam. The computer analyzes this signal through its program and decides whether to use it, and if it does it signals through pin 14 and enables gate A11 and that particular signal to be stored in the DATCOMP section to be described hereinafter.

The voltage levels of the comparators A5 and A6 are set so that a signal cannot be derived from both of them simultaneously. A criteria for a signal output of A6 is that if the signal $E_o$ is not full scale, it is within the 0.050 inch linear range of the particular beam being detected, the output is activated. The 1000 ohm variable potentiometer 119 allows the reference level on A6 to be set or adjusted dependent upon the particular characteristics of the beam paths being measured. It can be done by utilizing a pragmatic calibration in which we move an object into the beam to find the center of the beam and then move it back 0.025 inches and then set this for the voltage level that occurs at that point. The other way of doing it is to calculate what the output full scale of the beam should be and then what the voltage level should be at a point where the beam is 25 percent obscured. Typically, the voltage level is approximately 4 volts. Hence, it should be understood that the A6 comparator is set up to establish a maximum voltage level that indicates that a beam is obscured to within the linear range. It does not indicate the minimum level where it would begin to fall out of the linear range again, as at that point, it will begin to fall into the linear range of the next adjacent beam path. So A6 is calibrated in one of these several ways set forth above so that it is going to detect when a particular beam path is being obscured in its linear range. A5 is calibrated to detect when the present signal is within 1 percent of full scale or of the previous signal.

The outputs of the comparators each go to respective inverters A7 and A8, and then set to gates A9 and A10. The gates A9 and A10 are enabled by a signal through pin 16 from the output buffer 112 acting through inverter A12 to enable both simultaneously.

If the signal indicates within 1 percent of full scale, this circuit itself sends the signal back into the DATFS out of gate A9, and through inverter A13 into point 6 of the DATFS. A signal is also picked off between A5 and A7 as an output to pin 18.

Now if it is a data signal and actuates comparator A6, it must be determined whether it is the first data signal received during a particular scan. This is accomplished by a signal being picked off at pin 15 and sent into the computer, where the computer determines whether it is the first signal during the scan or not, and it if is the first then an enable signal is sent over pin 14 to enable gate A12 to cause that particular signal to be sampled and held in the data comp sample and hold described more fully hereinafter. The computer can tell whether it is the first signal during the scan by utilizing a table and proper programming which is quite well known and understood by a person familiar with programming and skilled in the art. It is true however that this detection could also be by specific hardware by using a flip flop, for example, which would be reset at the start of each scan and tripped upon the first data hit. By definition, the first time a data hit is received, it has to be within the 0.050 central linear range of the beam being measured.

DATA COMP SECTION OF THE DATA SCALING AND DATA STORAGE BLOCK

Figure 10:
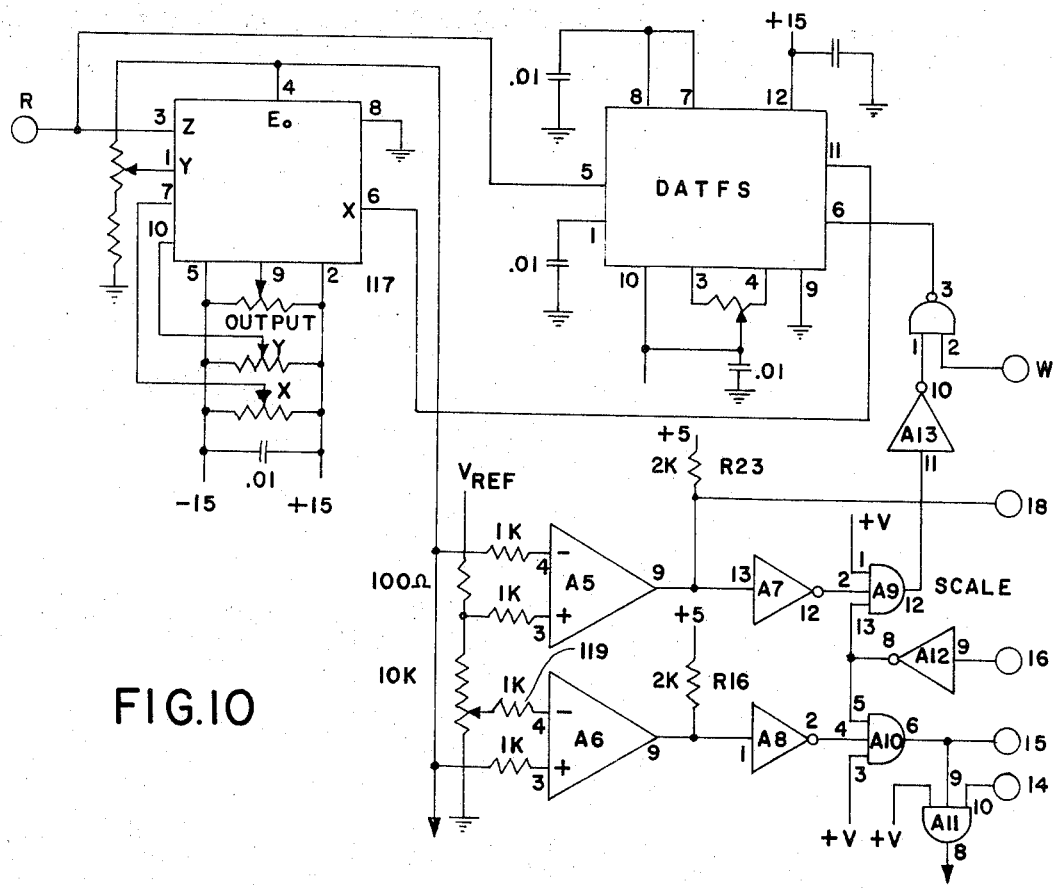
FIG. 10 is an electrical schematic of a portion of Data Sealing and Data Storage Block of FIG. 5.
Figure 11:
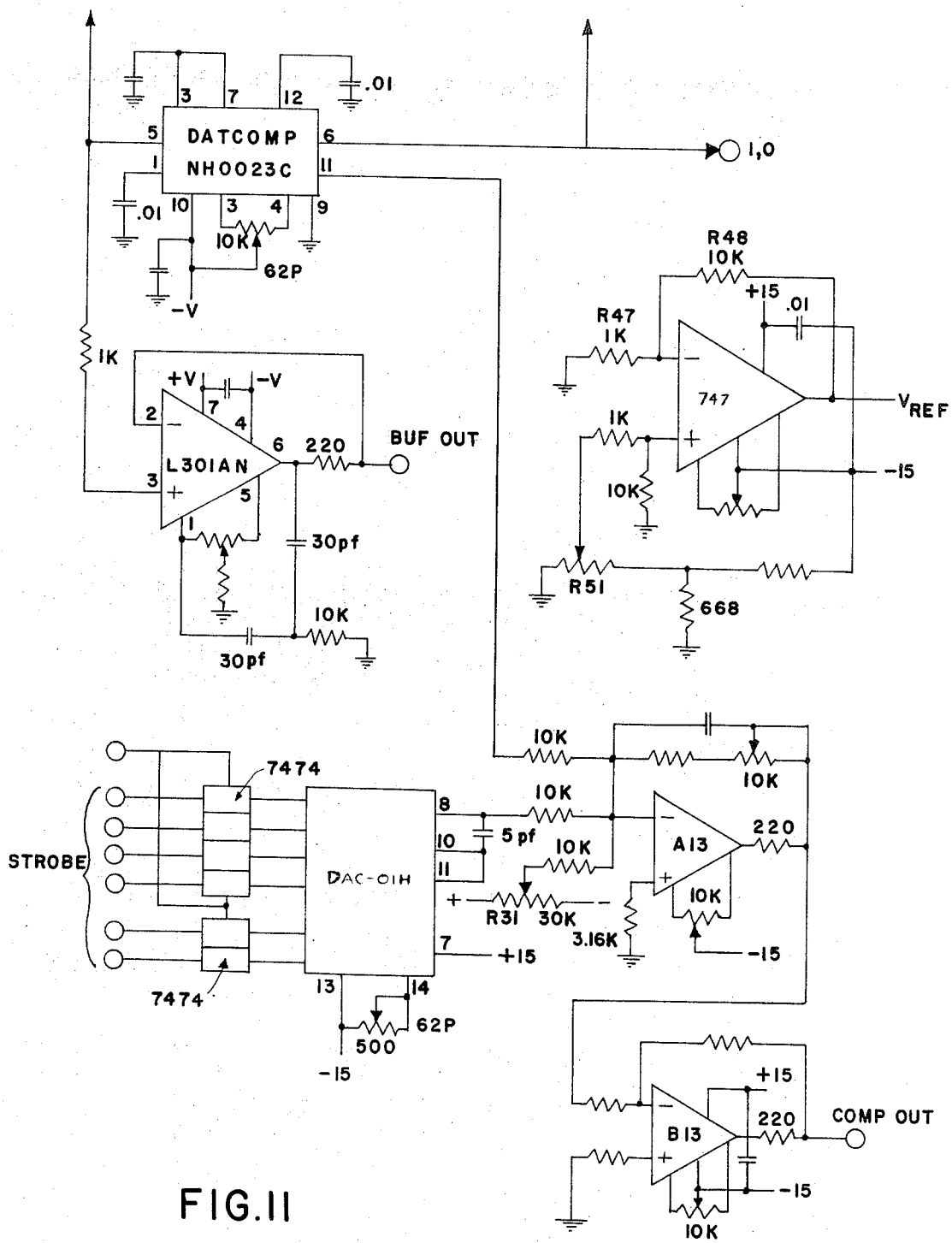
FIG. 11 is an electrical schematic of the remainder of Data Sealing and Data Storage Block of FIG. 5.

Now look at FIG. 11 which in conjunction with FIG. 10 comprises the entire data scaling and data storage block. The analog output from the 117 block of FIG. 10 becomes the input signal to pin 5 of the DATCOMP sample and hold NH0023C, and the output from the A11 gate of FIG. 10 is the input to pin G of the DATCOMP. The remainder of this circuitry includes a 301AN buffer amplifier likewise receiving the input signal from the 117 block of FIG. 10, a six bit digital to analog converter DAC–01H cooperating between three 7475 data converters made by National Semiconductor Corporation of Santa Clara, Calif., or a similar piece of equipment, and amplifiers A13 and B13 cooperating with the outputs from the six bit digital to analog converter. Various potentiometers are added for adjustment capabilities, with capacitors added for stabilization characteristics and temperature compensation, all as is well known by one skilled in the art.

As a practical problem in implementing a system of this type, since the beams are 0.050 of an inch apart, it is possible that during any particular scan or any particular run, not necessarily the same beam is interrupted each time. If the object being measured is moving, it could interrupt a previous beam or a later beam, or even a beam one or two paths away. Therefore, in order to keep the output wave form in an analog or continuous wave form this system must compensate for the different beams being utilized. This is done by selecting the first data hit in the first scan as a reference beam for future measurement purposes. This beam is assigned a zero offset. Now if the beam previous to that is hit on the next scan, the next previous one would have a value of −1 and the second previous −2, or going the other way, the first successive beam would be at +1 and the second successive +2. This in effect allows 0.250 inch measurement range or one fourth inch. The circuit just described above is designed to assign a 20 volt level from $-10^r$ to $+10^r$ to cover this 0.250 inch measurement range. At a zero output or on the reference beam, namley the first data hit on the first scan, a zero voltage level is designated.

The six input lines to the 7475 converters are addresses from the computer. Each section of the 7475 can store 2 bits of data. The computer determines for the particular data hit the voltage level at which this hit occurs. If it is the first hit, it will automatically assign a value zero and puts out an address into the 7475 storage indicating a zero value. The value from the six bit 7475 is actually an analog value ranging from zero to 10 volts.

To summarize the operation of the circuitry of FIG. 11, it should be understood that the pin 5 of the DATCOMP has an analog input which is the exact output signal coming as the $E_o$ from pin 4 of the multiplier of FIG. 10. The DATCOMP is told when to sample and hold by a digital input coming from the A11 gate of FIG. 10 as actuated by pin 14 from the computer. Now the sampled and held signal in the DATCOMP is then sent from pin 11 down through the 10k resistor to summing injunction R where it is an input to adder A13.

In order to create a dynamic readout condition where we have a rotating tire or an object moving into or out of the beam paths, and to give an output signal that represents the surface in a continuous manner, rather than an instantaneous signal, the 7475 storage units operating in conjunction with the six bit D to A converter co-ordinate with the programming of the computer to establish initially the reference level by means of the first signal representing the first data hit or partially interrupted beam path. As we move to and from that particular beam path, the six bit D to A converter will add to or subtract from the signal coming into summing injunction R. Hence, for example if the signal from pin 15 of FIG. 10 indicates that the second successive beam path has now been interrupted, the computer will generate a signal over the address lines into the 7475 to create a proper analog signal out of the D to A converter so that a proper additive voltage is placed at junction R in combination with the signal from the DATCOMP so that the output signal from A13 represents a dynamic signal, rather than an instantaneous signal. This coordination through the address lines with the computer in this manner is clearly quite possible through the use of proper programming and is well understood by one skilled in the art.

In order to allow A13 to cover the full −10 to +10 voltage range defined above to represent 0.250 inches of movement, adjustable potentiometer R31 is provided, and adjusted to provide a zero signal from A13 when the central position of the zero beam is showing. The 500 ohm potentiometer associated with the 6 bit D to A converter allows the converter to be properly calibrated for its appropriate 0 to +10 voltage output.

The purpose of the B13 adder is primarily to invert the A13 output, but it is also to isolate the output terminal from the A13 summer, or to serve as a buffer. Hence, any loading that occurs here will not be reflected back so that it provides a precision readout characteristic.

In order to buffer the output from the multiplier 117 of FIG. 10, a 301AN amplifier might be used as illustrated in FIG. 11. This 301AN amplifier might feed a signal, for example, to an analog to a digital converter so that the computer might perform the same function that is currently being performed by the 6 bit D to A and the appropriate adder junctions with the summer A13 of FIG. 11.

The strobe pulse feeding into the 7475 address temporary register is a signal generated by the computer and in effect initiates a new input from the computer for each new beam path pulse. The strobe signal actually comes through the input buffer and in effect it is in concidence with the computer signal to pin 14 of FIG. 10. Anytime that data is put into the computer or any time the sample and hold is updated, the data input to the 7475 and the 6 bit D to A is also simultaneously updated by this strobe pulse. This then allows a continuous or dynamic wave form to be generated as an object moves from one beam path to another effecting the dynamic condition. Naturally, if the same beam path is continuously measured no update or compensation for adjacent beam paths is necessary, and in that instance the D to A converter does not provide any change of compensation to the signal coming from the DATCOMP of FIG. 11.

OUTPUT BUFFER

Figure 12:
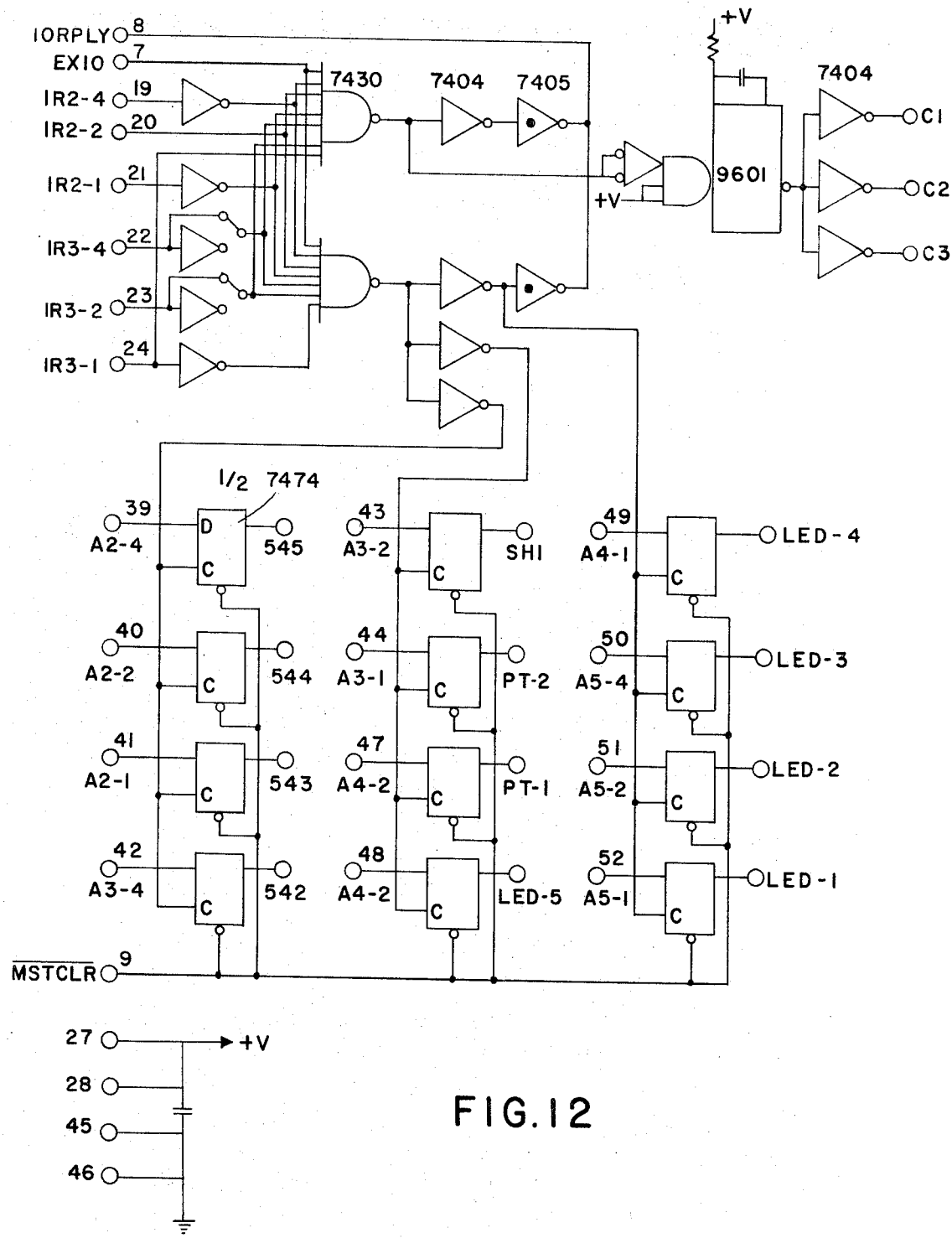
FIG. 12 is an electrical schematic of the computer buffer of FIG. 5.

The output buffer is illustrated in FIG. 12 of the drawings. The pulse signal that turns on the LED's and determines its duration is derived by this buffer. The pulse signal occurs upon the generation of signals in the computer provided to indicate the LED address and the EX10 signal coming into pin 7. The computer buffer select signals are indicated as coming in on pins 19–24, respectively. The EX10 is an execute IO signal, and as soon as the computer sends an execute IO signal and the proper address is sent, a pulse is applied to the 9601 one shot pulse generator, and this pulse is of a duration determined by the time constant of the 9601. The generator is of the type that produces a one pulse output for a positive or negative change of the input depending upon which way it is set up. A typical generator would be one manufactured by Fairchild Semiconductor, of Mountain View, Calif.

The output of the generator is buffered by three 7404 inverters with output signals coming to pins C1, C2, and C3. Note, for example, the C1 signal has an input to pin 6 of the NH0023C of FIG. 9.

It should be understood that each of C1, C2, and C3 will have an output on it each time the 9601 fires, and that these are three true output signals, and are used at other places in the circuitry such as in the data scaling and data storage block 118 where it comes in as a signal to pin 16 to allow the output of the two comparators to be gated on out through the respective gates associated therewith. It is also sent into the LED select block 146, and this will be described hereinbelow.

The other circuitry appearing in the output buffer consists of a plurality of bit storage units (12 in this particular case) each one of which is one half of a 7474 which is a two bit storage register made by firms such as National, Texas Instruments, and the like. The data from the computer is brought in on the address lines A2–4 through A5–1. When the data is present on those lines in the computer, and through the IR inputs, and in conjunction with an execute IO signal on pin 7, it causes a voltage level to be generated on the bottom of the 7430 eight input NAND gate. This causes a pulse to be distributed to all the data storage units coming in on the C input which causes whatever is on the D input to appear on it output, and to stay there until it gets a new C input. Hence, the computer brings up the address and locks them into the respective two bit storage registers for output whenever the pulse is set into the C input. The inputs to pins 22 and 23 may either be inverted or go straight in depending upon the circled switch arrangement, and this is optional as to whether the inputs are desired to be true or inverted.

The output of certain of the two bit storage registers go to the appropriate LED's, as indicated by the LED address pins. Certain other outputs are PT1 and PT2. These are the transistor or photofet address lines, and the others labeled SH1-SH5 are the inputs to the 6 bit D to A converter storage.

LED SELECT

Figure 13:
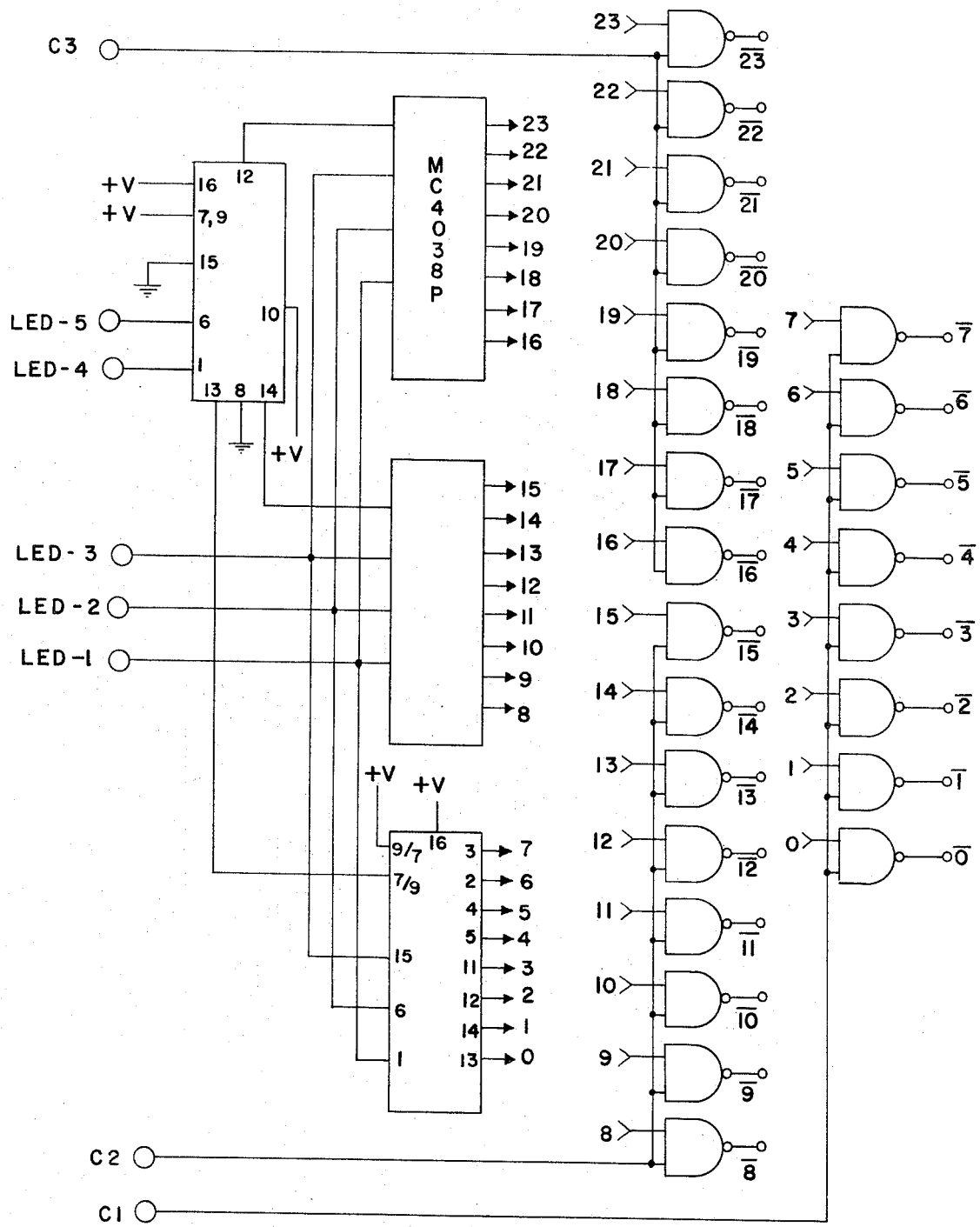
FIG. 13 is an electrical schematic of the LED Select Block of FIG. 5.

The LED select, as shown in FIG. 13, utilizes the C1–C3 pin inputs from FIG. 12, and the LED 1–5 inputs. These inputs coordinate with respective 4038 one out of eight selectors, and it should be noted that the resultant outputs through respective AND gates are numbered from 0–23. These outputs coordinate with the two input AND gates, where one input is either C1–C3 pulse and the other input is the pulse from the respective one out of eight selector so that the appropriate NAND gate is actuated depending upon the particular LED select as coordinated from the computer to and through the output buffer. The outputs from FIG. 13 go to the LED driver section 148 to actually drive one LED into transmission of light energy. This circuitry thus actuates one LED with a precisely controlled amount of current from the one shot pulse generator which generates a pulse that turns on rapidly and turns off rapidly.

LED DRIVERS

The particular circuit utilized is illustrated in FIG. 14, and comprises an input pin A providing a logic input into an inverter which feeds into the base of a 2N3568 transistor. The transistor coordinates a pair of resistors so that when it turns on it causes collector current to flow through the two resistors and the circuit. The center point between resistors is hooked through a PNP transistor, that is a Darlington pair 2N 3645, MJE 2955, which causes a high amount of collective voltage from their output at pin B for a very small amount of input. The initiation pulse on pin A turns on the 3645, MJE 2955 transistors operating in a collective fashion. The circuit is adjustable by a 100 ohm potentiometer. The signal output from pin B is illustrated as a 5 microsecond pulse with approximately 2–3 volts amplitude. Note the extremely fast rise and decay time which is accomplished by this particular driver circuit. The potentiometer associated with the single 3645 transistor base is the adjustment to control the current generated by this circuit to drive the LED emitter.

INPUT BUFFER

Figure 15:
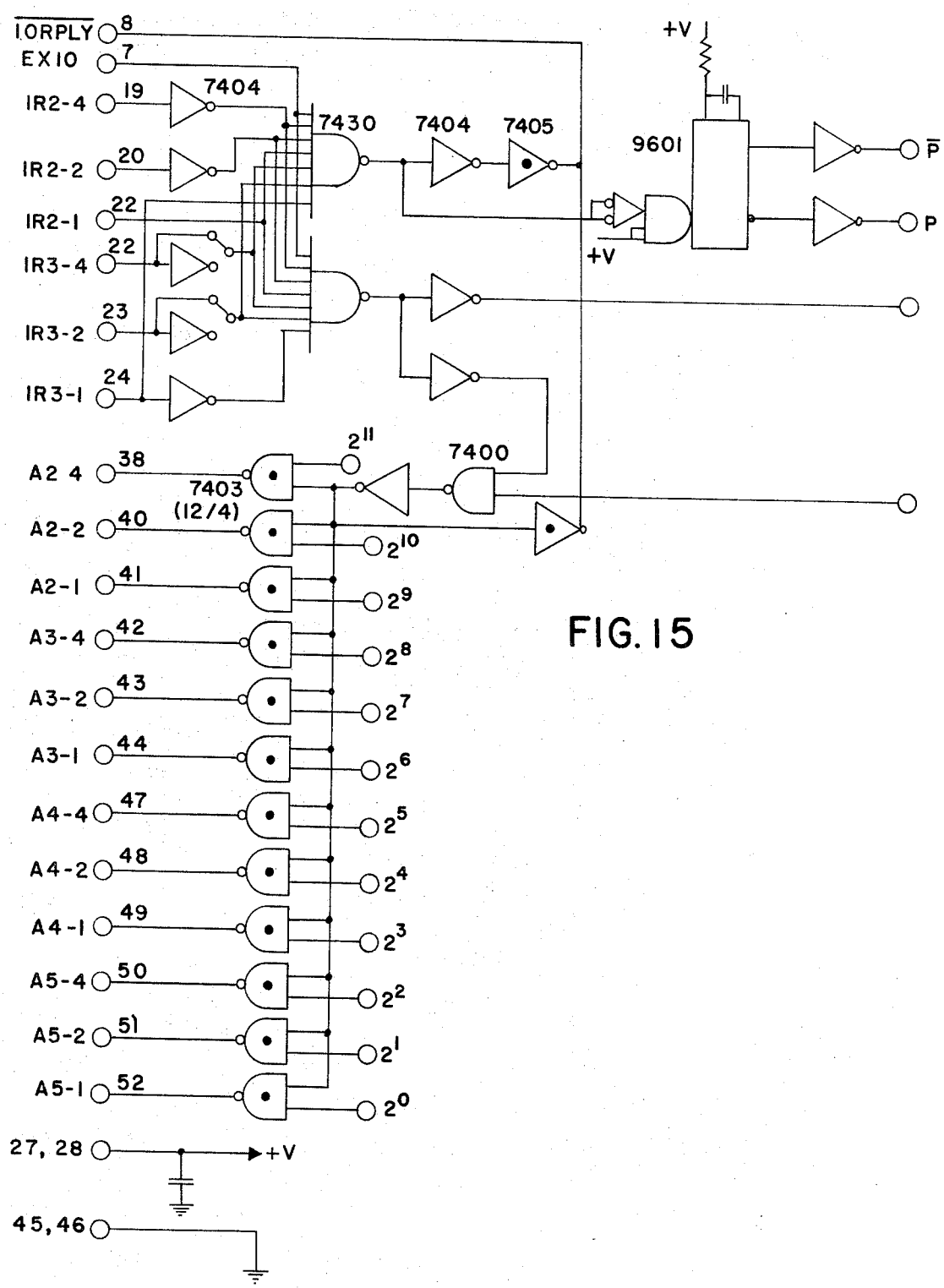
FIG. 15 is an electrical schematic of the Computer Input Buffer Block of FIG. 5.

The input buffer 126 is illustrated in FIG. 15, and in essence is very much the same as the output buffer 112 of FIG. 12. The top portion is exactly the same as the top portion of the buffer 112 while the bottom portion is purely to generate signals for an analog to digital converter if it was desired to use the same. Currently, this portion of FIG. 15 is not anticipated as being necessary for a tire runout measurement system or the like as defined above in the specification, except for the $2^{10}$ input. This input receives a pulse from the A10 gate through pin 15 of FIG. 10.

GENERAL CONSIDERATIONS

It is desirable that all LED's be continuously pulsed sequentially even though a particular beam path is being utilized, so as to obtain a tem-perature stability for elimination of calibration problems.

Hence, it should be understood that the system in effect operates on a course, fine, and proportional measurement, but that in effect all these are performed intergrally within the system as defined above. However, first the system selects the particular receiver where the first interruption of a beam path occurs as all beam paths are sequenced. Next, the particular beam path which is interrupted is determined to achieve the fine measurement, and then the proportional part of the linear 0.050 inches range of that beam path is measured to determined extremely fine accuracy.

A further feature of consideration in the invention is that since there is a considerable time period between separate beam path actuations, where the computer has time to compute other operations, a multi-channel concept could quite convieveably be incorporated where a plurality of transmitters and receivers operating on different units would time share the same computer and electronic peripheral equipment.

A further improvement in the system might utilize a fiber optic transmitter where it was desired to utilize a smaller or larger light emitting diode and either reduce or enlarge the resultant size of the output beam. To this end, reference should be made to FIGS. 16A and 16B which illustrate a fiber optic bundle 160 associated with a 0.150 inch diameter LED 162 where the end area of the fibers at 164 are between 0.062 to 0.063 in width and 0.205 plus or minus 0.005 inches in height to provide the type of 0.050 range in the middle of the 0.200 range that meets the objects of the invention. A mask 166 is provided to give the precise beam path desired. The fiber optic bundle 160 improves resolution, in effect substantially eliminates the need for a mask, and if the fibers are randomly oriented from their face position adjacent the LED surface out to the end where they form the rectangular mask configuration desired, it linearizes the field power patterned at the receivers, and gives a wider linear range than the 0.050 range currently available from the LED's now available on the market, The conventional LED configuration is shown in FIGS. 17 and 18 where the LED and mask are illustrated by the same numbers as in FIGS. 16A and 16B with the suffix added.

COMPUTER — TIMING AND CONTROL

Numerous mention has been made throughout the specification of the generation of computer signals, addresses, etc. Any suitable general purpose digital computer would neet the objects of the invention. However, with respect to the embodiment of FIGS. 5–15, the invention uses a Model 118, 18 Bit computer as made by Electronics Processors, Inc., 5050 S. Federal Blvd., Englewood, Colo. This computer uses its own programming language to accomplish the software necessary to achieve the programming of the invention. The particular program utilized to achieve operation in the tire inspection operation described above is set forth as follows:

| | | | | | | |
|---|---|---|---|---|---|---|
| | | @00354 | 101116 | @00441 | 002000 | @00526 | 000527 |
| | | @00355 | 730361 | @00442 | 003000 | @00527 | 000364 |
| | | @00356 | 200435 | @00443 | 004000 | @00530 | 000001 |
| | | @00357 | 100407 | @00444 | 000000 | @00531 | 510540 |
| @00273 | 200427 | @00360 | 000312 | @00445 | 000000 | @00532 | 510541 |
| @00274 | 300420 | @00361 | 200434 | @00446 | 000000 | @00533 | 777777 |
| @00275 | 300421 | @00362 | 100407 | @00447 | 000000 | @00534 | 112101 |
| @00276 | 300422 | @00363 | 000306 | @00450 | 000001 | @00535 | 115104 |
| @00277 | 300424 | @00364 | 200421 | @00441 | 000002 | @00536 | 115104 |
| @00300 | 200427 | @00365 | 770873 | @00452 | 000003 | @00537 | 675240 |
| @00301 | 000302 | @00366 | 200420 | @00453 | 000004 | @00540 | 200423 |
| @00302 | 100413 | @00367 | 730401 | @00454 | 000005 | @00541 | 301376 |
| @00303 | 200441 | @00370 | 200421 | @00455 | 000006 | @00542 | 200424 |
| @00304 | 750277 | @00371 | 301376 | @00456 | 000007 | @00543 | 101074 |
| @00305 | 750277 | @00372 | 200422 | @00457 | 000042 | @00544 | 300545 |
| @00306 | 200427 | @00373 | 101116 | @00460 | 000043 | @00545 | 200440 |
| @00307 | 000310 | @00374 | 000375 | @00461 | 000044 | @00546 | 702600 |
| @00310 | 750277 | @00375 | 100501 | @00462 | 000045 | @00547 | 703100 |
| @00311 | 750277 | @00376 | 000347 | @00463 | 000100 | @00550 | 000376 |
| @00312 | 760277 | @00377 | 100407 | @00464 | 000101 | @00551 | 675240 |
| @00313 | 200423 | @00400 | 000312 | @00465 | 000102 | | |
| @00314 | 301376 | @00401 | 200485 | @00466 | 000103 | | |
| @00315 | 200424 | @00402 | 750521 | @00467 | 000104 | @00100 | 000101 |
| @00316 | 101074 | @00403 | 300420 | @00470 | 000105 | @00101 | 000040 |
| @00317 | 300320 | @00404 | 200421 | @00471 | 000106 | @00102 | 000141 |
| @00320 | 200440 | @00405 | 200432 | @00472 | 000107 | @00103 | 000000 |
| @00321 | 300425 | @00406 | 000376 | @00473 | 000110 | @00104 | 000102 |
| @00322 | 200426 | @00407 | 000337 | @00474 | 000111 | @00105 | 000041 |
| @00323 | 301376 | @00410 | 101017 | @00475 | 000112 | @00106 | 000142 |
| @00324 | 200421 | @00411 | 730407 | @00476 | 000113 | @00107 | 000001 |
| @00325 | 101074 | @00412 | 000410 | @00477 | 000000 | @00110 | 000103 |
| @00326 | 300327 | @00413 | 000303 | @00500 | 000000 | @00111 | 000042 |
| @00327 | 200111 | @00414 | 300421 | @00501 | 000376 | @00112 | 000143 |
| @00330 | 301376 | @00415 | 000416 | @00502 | 300424 | @00113 | 000002 |
| @00331 | 200425 | @00416 | 300530 | @00503 | 300425 | @00114 | 000104 |
| @00332 | 101074 | @00417 | 000413 | @00504 | 750513 | @00115 | 000043 |
| @00333 | 702600 | @00420 | 000001 | @00505 | 200431 | @00116 | 000144 |
| @00334 | 702700 | @00421 | 000011 | @00506 | 301376 | @00117 | 000003 |
| @00335 | 200432 | @00422 | 000012 | @00507 | 200425 | @00120 | 000105 |
| @00336 | 100407 | @00423 | 200441 | @00510 | 101116 | @00121 | 000044 |
| @00337 | 000310 | @00424 | 777777 | @00511 | 750273 | @00122 | 000145 |
| @00340 | 703000 | @00425 | 000001 | @00512 | 000540 | @00123 | 000004 |
| @00341 | 750277 | @00426 | 200100 | @00513 | 200427 | | |
| @00342 | 300425 | @00427 | 000000 | @00514 | 301376 | | |

| | | | | | |
|---|---|---|---|---|---|
| @00343 | 420425 | @00430 | 000001 | @00515 | 200424 |
| @00344 | 500425 | @00431 | 000005 | @00516 | 101116 |
| @00345 | 200425 | @00432 | 000003 | @00517 | 300425 |
| @00346 | 750521 | @00433 | 000024 | @00520 | 000505 |
| @00347 | 200421 | @00434 | 000001 | @00521 | 200530 |
| @00350 | 101001 | @00435 | 000001 | @00522 | 730524 |
| @00351 | 300421 | @00436 | 000004 | @00523 | 000347 |
| @00352 | 301974 | @00437 | 000000 | @00524 | 200430 |
| @00353 | 200433 | @00440 | 001000 | @00525 | 300524 |

It should be understood that the technique of the invention is to monitor or determine surface position with respect to a reference using a vignette anomaly principal.

While in accordance with the Patent Statutes, one embodiment of the invention has been illustrated and described in detail, it should be understood that the invention is not limited thereto or thereby, but that the inventive scope is defined in the appended claims.

What is claimed is:

1. Apparatus to effect a non-contact position measurement of a surface which comprise:
   at least one source means of radiation energy;
   at least one detecting means to detect said radiation energy positioned in spaced relation to said source means and cooperative therewith to define at least two separate substantially adjacent radiation energy paths between said source means and said detecting means, whereby each detecting means can detect the radiation energy from each source means, and where the radiation energy paths defined between the source means and the detecting means intersect in adjacent edge to edge relation along a line in a plane therebetween.

2. Apparatus according to claim 1 where the source means of radiation energy are light transmitting diodes, and the detecting means are light sensitive elements.

3. Apparatus according to claim 1 wherein said line is midway between the diodes and elements, and is positioned such that the objects to be measured move along said line.

4. Apparatus according to claim 1 wherein there are at least two source means, which are light emitting diodes, and one detecting means element.

5. Apparatus according to claim 1 where there are at least two detecting means elements, and one source means which is a light emitting diode.

6. Apparatus according to claim 1 where there are at least two detecting means elements, and at least two source means which are light emitting diodes.

7. Apparatus according to claim 6 which includes means to sequentially actuate each diode in order while receiving at only one of the elements, and then repeat the sequential actuation of the diodes while receiving at only the next sequential element, and continuing in sequential order of elements until all elements have acted as separate individual receivers or an object has interferred with the light path between any of the diodes and a specific element,
   means to determine when one of the light paths to a particular receiver has been interrupted, and which path from a particular diode has been interrupted, and
   means to determine the proportion of said path that is being received by said element.

8. Apparatus according to claim 6 including mask means associated with the diodes and elements so that the amount of light across each path is substantially uniform.

9. A method for measuring the position of a surface of an object along a line in a plane which includes the steps of:
   a. providing a plurality of sequentially actuated radiant energy paths in space in substantially adjacent relation to each other intersecting along said line in adjacent edge to edge relation in the plane,
   b. viewing each path and determining which path is interrupted along said line by the surface of the object, and
   c. determining the proportion of the interruption of said path to establish the position of said surface.

10. A method according to claim 9 which includes the step of making the radiant energy substantially uniform across each path.

11. A method according to claim 9 which includes the step of establishing new paths in a different area while maintaining the adjacent edge to edge relation of the paths if all prior paths have been uniformly effected during the sequential actuation thereof, and then repeating the steps of claim 9.

12. A method according to claim 9 including the step of monitoring the nearest adjacent path when a path is interrupted near to one of its lateral edges.

13. Apparatus to effect a non-contact position measurement of a surface along a line in a plane which comprises:
   at least one source of means of radiation energy;
   at least one detecting means to detect said radiation energy positioned in spaced relation to said source means and cooperative therewith to define at least two separate substantially adjacent radiation energy paths intersecting in adjacent edge to edge relation along said line in the plane between said source means and said detecting means;
   means to compensate for ambient light interference with said radiation energy paths;
   means to sequentially actuate said source means and detect if any portion of the energy paths are interrupted by an object extending thereinto, and;
   means to determine the proportion of interruption of the particular path detected and determined to be partially interrupted and represent this as a surface position measurement signal.

14. Apparatus according to claim 13 where said means to sequentially actuate said source means includes means to provide a fast high rise, rapid fall pluse actuation to said source means of radiant energy.

15. Apparatus according to claim 13 where the means to determine the proportion of the path interrupted includes a multiplier and a sample and hold circuit operating in conjunction, with feedback from the sample and hold circuit to the multiplier causing the sealed output of the multiplier to be an instantaneous sealed signal which is then stored in the sample and hold circuit for each energy path pulse.

16. Apparatus according to claim 15 including circuit means to shift the path detection to the nearest adjacent energy path for a proportional scaled dynamic output signal of beam path interruption, when a path is interrupted near to one of its lateral edges.

17. Apparatus according to claim 16 which includes buffer circuit means to eliminate noise from the dynamic scaled beam path interruption signal.

18. Apparatus according to claim 13 including fiber optic means receiving the radiation energy from said source means of radiation energy transmitting, and radiating said energy paths, each path having desired linear energy characteristics across the width thereof.

* * * * *